US009718684B1

United States Patent
Woodall et al.

(10) Patent No.: US 9,718,684 B1
(45) Date of Patent: Aug. 1, 2017

(54) METHOD FOR CONTINUOUSLY PRODUCING HYDROGEN, HEAT AND ALUMINUM OXIDES ON DEMAND

(71) Applicants: Jerry M Woodall, Davis, CA (US); Thomas E Rowley, San Jose, CA (US)

(72) Inventors: Jerry M Woodall, Davis, CA (US); Thomas E Rowley, San Jose, CA (US)

( * ) Notice: Subject to any disclaimer, the term of this patent is extended or adjusted under 35 U.S.C. 154(b) by 0 days.

(21) Appl. No.: 15/380,711

(22) Filed: Dec. 15, 2016

Related U.S. Application Data (62) Division of application No. 14/514,777, filed on Oct. 15, 2014, now Pat. No. 9,624,103.

(60) Provisional application No. 61/890,983, filed on Oct. 15, 2013.

(51) Int. Cl.
*C01B 3/08* (2006.01)
*C01F 7/42* (2006.01)
*C22C 28/00* (2006.01)

(52) U.S. Cl.
CPC ............ *C01B 3/08* (2013.01); *C01F 7/428* (2013.01); *C22C 28/00* (2013.01)

(58) Field of Classification Search
CPC ........................................................ C01B 3/08
See application file for complete search history.

(56) References Cited

U.S. PATENT DOCUMENTS 4,358,291 A    11/1982   Cuomo et al.
9,056,769 B1 *   6/2015   Woodall .................. C01B 3/08

* cited by examiner

*Primary Examiner* — Melvin C Mayes
*Assistant Examiner* — Kenneth Vaden
(74) *Attorney, Agent, or Firm* — John P. Costello; Costello Law Corporation (57) ABSTRACT

A method for producing hydrogen gas, heat and an oxide component using a water splitting process is disclosed. The method involves providing a dry first chamber containing a passivating-oxide preventing reagent that receives a solid material feedstock and dissolves the solid material feedstock in the passivating-oxide preventing reagent. The passivating-oxide preventing reagent becomes saturated with the solid material in the first chamber and is then transferred to a second chamber without contact with water. In the second chamber, the solid material saturated in the passivating-oxide preventing reagent reacts with the water so as to generate hydrogen gas, an oxide component and heat. Following the reaction, the solid material depleted passivating-oxide preventing reagent and water is recycled to be re-used in the water splitting process.

7 Claims, 4 Drawing Sheets

METHOD FOR CONTINUOUSLY PRODUCING HYDROGEN, HEAT AND ALUMINUM OXIDES ON DEMAND

CROSS-REFERENCE TO RELATED APPLICATIONS

The present application is a divisional of U.S. utility patent application Ser. No. 14/514,777 filed on Oct. 15, 2014, now U.S. Pat. No. 9,624,103, which claimed priority from U.S. provisional application Ser. No. 61/890,983, filed on Oct. 15, 2013. The disclosures of these prior provisional and utility applications are incorporated herein as if set out in full.

BACKGROUND OF THE DISCLOSURE

Technical Field of the Disclosure

The present embodiment relates in general to a method and apparatus for generating hydrogen. More specifically, the present disclosure relates to a method and system for continuously producing hydrogen gas, heat and aluminum oxide on-demand from solid aluminum using a water splitting process.

Description of the Related Art

Hydrogen can be generated by a variety of methods, including natural gas reforming, electrolysis, thermochemical reaction and photo catalytic methodologies. These methodologies produce carbon dioxide as a by-product, which requires a large amount of electrical energy which is expensive and has a large, negative environmental impact. These methods require solar energy with temperatures exceeding 1000 degrees Celsius, highly corrosive reactants and/or products and expensive reagents, complex nanostructured solids, and/or sacrificial oxidants or reductants other than water.

A number of variants of water split reaction used to produce hydrogen have been devised to overcome these problems. The water split reaction contemplates a fuel for splitting water into hydrogen and an oxide. In these reactions aluminum is used to generate hydrogen from water. Commonly, aluminum oxide compounds can be produced from bauxite ores by Bayer's process. In the water splitting process, the hydrogen is released as a gas and the oxygen combines with the aluminum to form the aluminum oxide compounds. The aluminum oxide compounds are produced as a protective oxide layer on the aluminum in contact with water at ambient temperature.

Aluminum has a tendency to be self-protecting by forming the aluminum oxide that inhibits reactions required for the formation of hydrogen and thus in some cases it is difficult, if not impossible, to use on a long term basis. Therefore, it has been accepted by those skilled in the art that the use of aluminum in a reaction with water to generate hydrogen gas requires that the protective oxide layer is efficiently and continuously removed, and that the reaction is kept at an elevated temperature.

In one prior art reference, U.S. Pat. No. 4,358,291, the inventors disclosed that if aluminum (Al) is dissolved in a liquid solution of gallium (Ga) or a liquid mixture of Ga and indium (In) at or near room temperature, then brought into contact with water, the Al in the liquid solution at the water interface would split water molecules ($H_2O$) into hydrogen gas, alumina ($Al_2O_3$), and generate heat. This reaction will proceed until all elemental Al in the liquid solution is converted to alumina. The solid aluminum (Al) will dissolve in dry, air exposed liquid melts of gallium (Ga), Ga-indium (Ga—In), or Ga—In-tin (Ga—In—Sn) at or near room temperature up to the solubility limit of about 2-3 weight percent Al.

When inert solid Al is dissolved in liquid Ga melt the solute aluminum is no longer passivated with alumina, its native oxide. Hence, when water is in contact with aluminum saturated gallium melt, the aluminum atoms at an interface between the melt and water are free to split the water into hydrogen gas and alumina while generating heat. The gallium used is inert with respect to splitting water, and hence reusable.

One drawback of this approach is that if the Al that is dissolved in the liquid solution in a dry environment and reacted to completion in the presence of excess water, the liquid solution is now under-saturated with respect to Al. This means that the liquid could theoretically be saturated with additional Al. When a solid piece of Al (whose density is less than liquid Ga) is floated on top of an under-saturated liquid of Ga in the presence of excess water, the solid piece of Al will not dissolve into an under-saturated Ga, Ga—In, or Ga—In-tin (Sn) liquid at or near room temperature. Further, the solid Al does not dissolve in under-saturated liquid Ga in the presence of water due to the fact that there is a layer of water between the liquid Ga and the solid Al that forms a barrier layer of alumina that is thicker than the alumina layer that forms between Ga and Al in air. Attempts have been made to find other methods to cope with these problems. One method is to heat a mixture of solid Al and Ga (or Ga—In or Ga—In—Sn) in an inert container above the melting point of Al, and then return the melt mixture back to room temperature. However, this method requires the use of crucible materials that will not react with Al melts and causes difficulty to empirically find optimal cooling rates and composition that will render the mixture suitable for practical applications.

Another drawback of this approach is that if the liquid solution containing Al is cooled to the point of freezing into a solid solution, very little reaction will occur. This is because unlike the case for liquid solutions, where the Al atoms can continuously diffuse to water-solution interface and react until the Al has all reacted, Al atoms in the frozen solution cannot move to the interface. Hence, only those Al atoms at the frozen solution surface can react with water. Once the Al atoms at the frozen solution surface react with water, the reaction stops.

In light of the foregoing, there is a need for a method and system for continuously producing hydrogen gas, heat, and aluminum oxides on-demand from solid aluminum using water splitting techniques that avoid the inherent problems with current technologies. Such a method and system would need to be implemented on an inexpensive and economically viable basis. Such a method and system would provide an under-saturated gallium liquid melt that will not react with water when covered with water or exposed to air. Further, such a method and apparatus would continuously dissolve a solid-state Al or other liquid metals into the under-saturated Ga liquid melt and its alloys in the presence of water to enable the continuous generation of hydrogen gas; the continuous production of economically important oxides of Al or other liquid metals; and the continuous generation of heat. Such a method and system would not be passivated with alumina by continuously dissolving Al into liquid Ga in the present of excess water. Such a method and system would include a plurality of chambers in which the solid-state Al is continuously dissolved in the Ga liquid melt and Al saturated Ga melt is reacted with the water at water-liquid melt interface separately to split the water into hydrogen gas and aluminum oxide. Furthermore, such a method and system would include at least one means for separating water and gallium from the water-oxide mixture for the purpose of reusing the water and gallium during the process. Such a method and system would include at least one means for collecting the aluminum hydroxide and converting it into ultra-high purity (UHP) alumina. Finally, such a method and system would provide a continuous and economical conversion of the solid-state Al of any purity to on-demand UHP hydrogen and UHP alumina, using any kind of water. The present embodiment accomplishes these objectives.

SUMMARY OF THE DISCLOSURE

To minimize the limitations found in the prior art, and to minimize other limitations that will be apparent upon the reading of the specification, the preferred embodiment of the present invention discloses a method and system for producing hydrogen gas, heat and an oxide component from a solid material feedstock using water splitting techniques. Water splitting is achieved through an inventive system and method which dissolves a solid material feedstock, such as solid aluminum, into a liquid passivating-oxide preventing agent on a dry side of the invention. For purposes of the invention, the dry side is devoid of any oxygen supplying reagent, such as water, or hydrogen peroxide. The passivating-oxide preventing agent becomes saturated with the solid material feedstock on the dry side. An opposite side of the invention comprises a wet side which receives the saturated passivating-oxide preventing agent from the dry side through fluid communication, wherein an oxygen supplying reagent, such as water is introduced to the wet side. The introduction of water to the wet side causes a water splitting reaction with the solid material feedstock dissolved in the passivating-oxide preventing agent to produce hydrogen gas, heat, and an oxide component. As the solid material is depleted on the wet side, a concentration gradient is dynamically produced between the depleting wet side and the solid material saturated dry side. This gradient between the dry and wet sides causes the solid material feedstock dissolved in the passivating-oxide preventing agent to diffuse from the dry side to the wet side. If the diffusion flow rate of the solid material from the dry side to the wet side is insufficient to sustain an appropriate reaction rate target, the forces of convection can be added via mechanical stirring, for example, to aid the water splitting reaction rate.

More specifically, the system comprises a first chamber filled with a passivating-oxide preventing agent that receives a solid material feedstock. The passivating-oxide preventing agent is substantially inert to water in an effective amount to prevent passivation of a solid material feedstock during oxidation. The solid material feedstock is capable of dissolving in the passivating-oxide preventing agent and solid material saturated passivating-oxide preventing agent is transferred to a second chamber. In the second chamber the solid material saturated in the passivating-oxide preventing agent reacts with the water so as to generate the hydrogen gas, oxide component and heat. The passivating-oxide preventing agent is recycled back to the second chamber and then to the first chamber. Similarly, the water is recycled back to the second chamber and used in the water splitting process. In a preferred embodiment, the solid material feedstock is aluminum feedstock and the oxide component is aluminum hydroxide. The passivating-oxide preventing agent is an under-saturated molten gallium.

In one embodiment, the liquid melt used in the hydrogen generation process is enhanced by the addition of a liquid-phase gallium-indium alloy that consists essentially of about 80% (eighty percent) gallium and 20% (twenty percent) indium (80/20 (Ga/In)). In another embodiment, the liquid melt used in the hydrogen generation process is enhanced by the addition of a liquid-phase gallium-indium-tin alloy that consists essentially of 68% (sixty-eight percent) Ga-22% (twenty-two percent) In-10% (ten percent) Sn.

The solid material feedstock is selected from the group consisting of: a strip of aluminum, a rod of aluminum, a pellet of aluminum, a tube of aluminum, granules of aluminum and a powder of aluminum and may be substantially pure aluminum or may contain other materials in the way of impurities or alloys so long as they do not impede the oxidation process and action of the passivating-oxide preventing agent.

A method for producing hydrogen gas and an oxide component using water splitting process is contemplated in one aspect of the invention. A first chamber is filled with a liquid melt and a solid material feedstock is inserted into the liquid melt. The solid material feedstock is submerged into the liquid melt so that the solid material feedstock dynamically dissolves in the liquid melt saturating the liquid melt. A solid material saturated liquid melt is passed to a second chamber via a first connection tube. Water is introduced to the second chamber containing the solid material saturated liquid melt via a water inlet. The solid material saturated in the liquid melt is reacted with the water at a water-liquid melt interface so as to split the water into the hydrogen gas, the oxide component and heat until the solid material therein is depleted. Then, water-oxide mixture is passed to a centrifuge or other filtering mechanism via an outlet tube to separate the oxide component, water, and molten gallium. The outlet tube is externally mounted with a heat exchanger pipe which removes excess heat generated during the process. The oxide component is passed to a furnace wherein the oxide component is dehydrated and heated to generate an ultra-high purity (UHP) alumina. The process is continued until the solid material feedstock submerged is converted into the ultra-high purity (UHP) alumina. Thus, the method provides continuous dissolution of the solid material feedstock into the passivating-oxide preventing agent and its alloys in the presence of excess water to enable continuous generation of the hydrogen gas, oxide component and heat.

The solid material feedstock is immersed in the Ga melt at ambient temperature or temperature between 30° C. and 95° C. in the first chamber. The solid material saturated Ga melt is transferred to the second chamber in which the water is introduced above the surface of the Al saturate Ga melt to split the water into aluminum hydroxide, hydrogen gas and heat. The process will continue until the solid-state materials are continuously immersed into the Ga and are converted to aluminum hydroxide. The ammonium hydroxide is dehydrated and heated to generate high purity alumina. The Ga melt is recycled back to the second chamber and then to the first chamber. Similarly, the water is recycled back to the second chamber and used in the water splitting process.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

For the purposes of promoting an understanding of the principles of the invention, reference will now be made to the embodiments illustrated in the drawings and described in the following written specification. It is understood that any alterations and modifications to the illustrated embodiments as would normally occur to one skilled in the art to which this invention pertains are encompassed with the scope of the invention.

In a preferred embodiment of the present invention, a system is provided in which aluminum is reacted with water and/or hydrogen peroxide to produce hydrogen and heat. If hydrogen peroxide is used, oxygen is generated in addition to hydrogen. The aluminum is treated with a passivation preventing agent so that the aluminum reacts continuously with the water to split the water into hydrogen and aluminum oxide. The hydrogen may be provided to a power generation element, such as a fuel cell or a combustion engine in a vehicle. More broadly, the aluminum-to-hydrogen methods of the present invention may be combined with apparatuses that convert the hydrogen, oxygen, and heat into electrical, mechanical, or thermal power.

The solid material feedstock is a metallic aluminum feedstock that oxidizes at low or near room temperature, but as noted above the solid material feedstock forms a passivating oxide layer which inhibits further oxidation. In the present invention, molten gallium serves as the passivating-oxide preventing agent that inhibits the passivation nature of the aluminum oxide layer and a plurality of chambers to provide submerging of solid material feedstock in the molten gallium, splitting of water and recycling of the molten gallium separately to continuously and economically convert solid aluminum feedstock of any purity to on-demand ultra-high purity (UHP) hydrogen and UHP alumina, using any kind of water. According to one embodiment of the present invention, the Al—Ga to hydrogen conversion process is enhanced by the addition of a liquid-phase gallium-indium alloy. According to another embodiment of the present invention, the Al—Ga to hydrogen conversion process is enhanced by the addition of a liquid-phase gallium-indium-tin alloy. Gallium, gallium-indium, gallium-indium-tin and other suitable alloys are desirable because they become liquid at low temperatures and have low vapor pressures, thereby allowing a wide temperature window for the aluminum oxidation reaction.

The process for controlled oxidation of the aluminum using water as the oxygen supplying reagent and gallium as the passivating oxide inhibitor, follows these reaction equations:

$$2Al + 3H_2O \rightarrow Al_2O_3 + 3H_2 + \Delta E_1 \quad \quad 1)$$

$$2H_2 + O_2 \rightarrow 2H_2O + \Delta E_2 \quad \quad 2)$$

where
$\Delta E_1 = 407$ kJ/mole Al=15.1 kJ/g of aluminum, and
$\Delta E_2 = 286$ kJ/mole $H_2 = 429$ kJ/mole Al=15.9 kJ/g of aluminum.

This process is renewable because the $Al_2O_3$ produced can be converted back into aluminum using reactions such as the following:

$$2Al_2O_3 + \Delta E_3 \rightarrow 4Al + 3O_2 \quad \quad 3)$$

$$2Al_2O_3 + 3C + \Delta E_4 \rightarrow 4Al + 3CO_2 \quad \quad 4)$$

where
$\Delta E_3 = 877$ kJ/mole of Al=32.5 kJ/g of aluminum, and
$\Delta E_4 = 582$ kJ/mole of Al=21.6 kJ/g of aluminum.

The energy density of aluminum as a fuel compares extremely favorably to other known technologies, as demonstrated by the following Table I:

TABLE I

| Fuel | Energy Density (kJ/g) | Engine | Efficiency (%) | Net Power (kJ/g) | Emission Products |
|---|---|---|---|---|---|
| Aluminum | 31 | Stirling or | 25-50 | 7.8-15.5 | $Al_2O_3$ |
|  |  | Fuel Cell | 25 | 7.8 | $H_2O$ |
| Gasoline | 47.5 | Internal Combustion | 20-25 | 9.5-11.9 | $CO_2$, CO, $NO_x$, $SO_x$, etc. |
| Methanol | 23 | Reformer + Fuel Cell | 30-40 | 6.9-9.2 | $H_2O$, $CO_2$, CO |

It can first be noted that the emission products from the aluminum source are fully recyclable. The water may be recycled to provide additional oxidizer for the aluminum in the reaction process. The aluminum oxide is environmentally benign and readily recyclable into aluminum that can be reused to generate hydrogen. It can also be noted that in the Stirling engine the heat product of the reaction is also used in power generation. Even if only the hydrogen is used (as in the fuel cell), the resulting efficiency is still 25 percent.

Since gallium is inert, substantially all of the gallium contained in the aluminum-gallium mixture remains after the aluminum has been consumed. The gallium may be re-used and is hence nearly 100% recyclable.

As an aside, the overall efficiency of the aluminum source protocol should also consider the efficiency of recycling the $Al_2O_3$ back into usable aluminum. Applying Equations 3 and 4 above, the cycle efficiency ranges from 12-18 percent, where cycle efficiency is the energy generated by the oxidation of the aluminum divided by the energy required to recycle the aluminum. This cycle efficiency assumes that only 25% of the available energy of the oxidation process is captured as useful power. Obviously, if more energy is captured (such as the heat generated by the reactions in Equations 1 and 2) then the recycle efficiency will improve.

Figure 1:
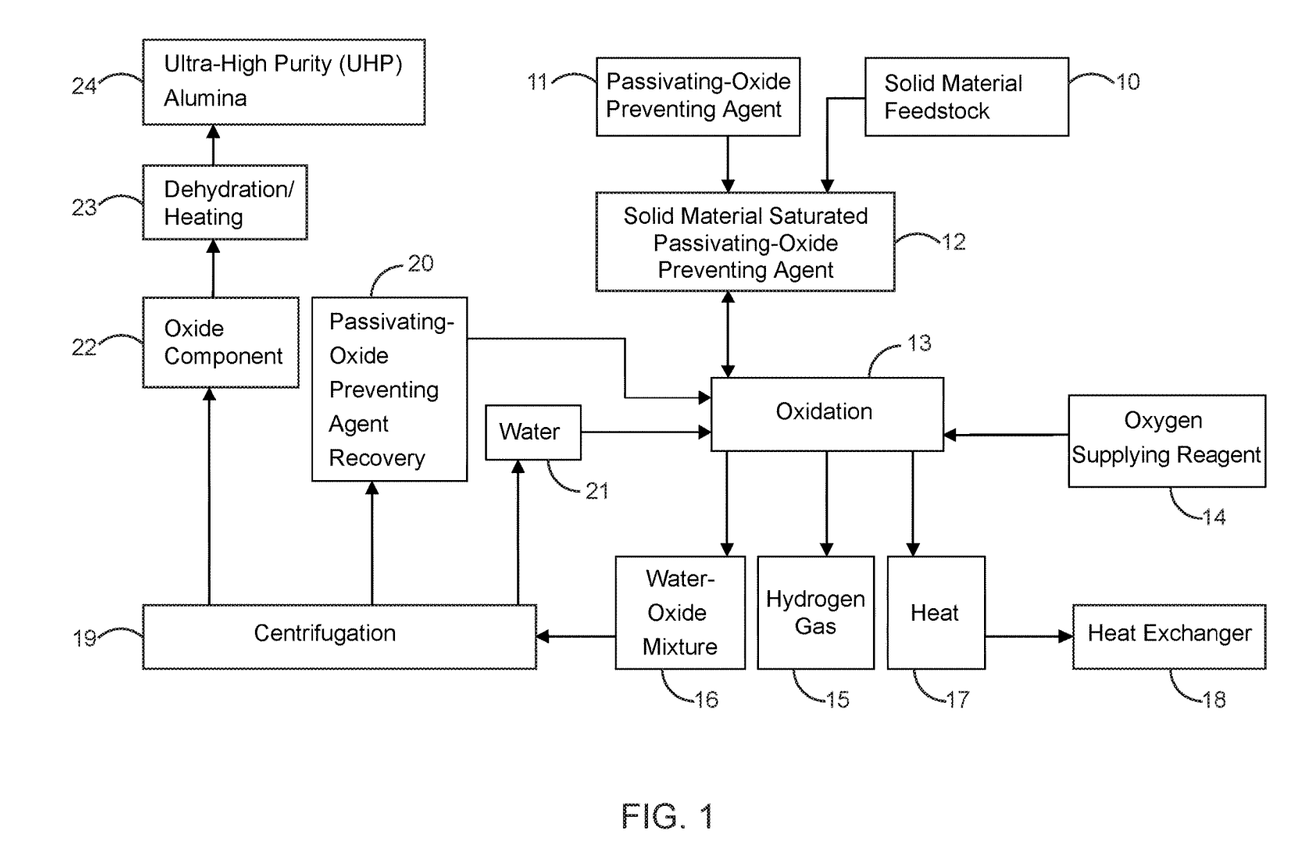
FIG. 1 illustrates a flow chart showing a closed cycle using a solid material feedstock, an oxygen supplying reagent and a passivating-oxide preventing agent to produce hydrogen gas, heat and an oxide component using a water splitting process in accordance with the preferred embodiment of the present invention.

The process steps used in the present invention are illustrated in the flow chart of FIG. 1. A source of solid material feedstock 10 is dissolved in a passivating-oxide preventing agent 11 which prevents the formation of an oxide component 22 on the surface of the solid material feedstock 10 when exposed to moisture or water. The submerged solid material feedstock 10 is saturated with the passivating-oxide preventing agent 11 to produce solid material saturated passivating-oxide preventing agent in a first chamber 12. The solid material feedstock 10 is submerged in the passivating-oxide preventing agent 11 in such a way that the solid material feedstock 10 does not make direct contact with moisture/water. The solid material saturated passivating-oxide preventing agent is passed to a second chamber 13 which either contains oxygen supplying reagent 14 or the oxygen supplying reagent 14 is supplied to the second chamber 13. The solid material saturated in the passivating-oxide preventing agent is reacted with the oxygen supplying reagent 14 like water and/or hydrogen peroxide and oxidized with the oxygen supplying reagent 14 in the second chamber 13. During the process, the solid material feedstock 10 is submerged in the liquid passivating-oxide preventing agent 11 and dissolves until the solubility limit of the passivating-oxide preventing agent is reached. The solid material feedstock 10 is a metallic aluminum feedstock. The metallic aluminum feedstock may be, for example, selected from the group consisting of: a strip of aluminum, a rod of aluminum, a pellet of aluminum, a tube of aluminum and granules of aluminum and may be substantially pure aluminum or may contain other materials in the way of impurities or alloys so long as they do not impede the oxidation process and action of the passivating-oxide preventing agent 11. The aluminum ordinarily forms an oxide coating upon exposure to the atmosphere, completely passivating the surface and inhibiting further oxidation. However, at a temperature sufficient to keep the passivating-oxide preventing agent 11 in a liquid state, the passivating-oxide preventing agent 11 dynamically dissolves the solid material feedstock thereby breaking up and preventing the formation of the oxide layer. This disruption of the oxide formation/deposition allows the oxidation reaction in the second chamber 13 to continue and consume more of the solid material feedstock 10. The solid material feedstock 10 saturated in the passivating-oxide preventing agent 11 is reacted with the oxygen supplying reagent 14 to split the oxygen supplying reagent 14 into hydrogen gas 15, the oxide component 22 and heat 17 until the solid material feedstock 10 is depleted. Thus, the process will continue until the solid material feedstock 10 saturated in the passivating-oxide preventing agent is continuously reacted with oxygen supplying reagent 14 and is converted to the hydrogen gas 15, oxide component 22 and heat 17. The oxygen supplying reagent 14 is introduced to the second chamber 13 via an external source.

The heat 17 and hydrogen gas 15 are co-generated energy outputs and the heat 17 released during the process is removed utilizing a heat exchanger pipe 18. Water-oxide mixture 16 has undergone centrifugation 19 in the preferred embodiment shown to recover the passivating-oxide preventing agent 20 obtained from the passivating-oxide preventing agent 11 that is not otherwise consumed during the reaction. The recovered passivating-oxide preventing agent 20 is returned back to the second chamber 13 and then to the first chamber 12. During centrifugation 19, the oxide component 22 is separated from water 21 and the water 21 is captured and returned to the second chamber 13 where it is used in the water splitting process. Alternatively, to centrifugation 19, a continuous filtration process (not shown) could provide separation of water 21 from the oxide component 22. The oxide component 22 produced has undergone dehydration/heating 23 to generate an ultra-high purity (UHP) alumina 24.

Prevention of the passivation oxide layer is accomplished by submerging the solid material feedstock 10 below a surface of the passivating-oxide preventing agent 11. Submerging involves the passivating-oxide preventing agent 11 spreading on the surface and adheres to the solid material feedstock 10. The solid material feedstock 10 is dissolved in the passivating-oxide preventing agent 11 and thereby the passivating-oxide preventing agent 11 becomes saturated with the solid material feedstock 10. The dissolved solid material feedstock 10 is reacted with the oxygen supplying reagent 14 so as to generate the hydrogen gas 15, oxide component 22 and heat 17. The passivating-oxide preventing agent 11 is an inert gallium melt or gallium-indium liquid-phase alloy or gallium-indium-tin liquid-phase alloy.

In a preferred embodiment, a system for producing hydrogen gas and an oxide component using water splitting process is illustrated. The system includes a plurality of chambers in fluid communication, the plurality of chambers that includes a first chamber filled with a liquid melt receives a solid material feedstock and a second chamber receives a solid material saturated liquid melt from the first chamber. The solid material saturated in the liquid melt is reacted with the water at a water-liquid melt interface so as to split the water into the hydrogen gas, the oxide component and heat until the solid material therein is depleted. The oxide component is dehydrated and heated to generate an ultra-high purity (UHP) alumina.

In one aspect of the present invention, a method for producing hydrogen gas and an oxide component using water splitting process is disclosed. A first chamber is filled with a liquid melt and a solid material feedstock is inserted into the liquid melt. The solid material feedstock is submerged into the liquid melt so that the solid material feedstock dynamically dissolves in the liquid melt. A solid material saturated liquid melt is passed to a second chamber via fluid communication. In the preferred embodiment, the fluid communication is accomplished by a first connection tube. Water is introduced to the second chamber containing the solid material saturated liquid melt via a water inlet. The solid material saturated in the liquid melt is reacted with the water at a water-liquid melt interface so as to split the water into the hydrogen gas, the oxide component and heat until the solid material therein is depleted. Then, water-oxide mixture is passed to a centrifuge via an outlet tube to separate the oxide component, water, and molten gallium. The outlet tube is externally mounted with a heat exchanger pipe which removes excess heat generated during the process. The oxide component is passed to a furnace wherein the oxide component is dehydrated and heated to generate an ultra-high purity (UHP) alumina. The process is continued until the solid material feedstock submerged is converted into the ultra-high purity (UHP) alumina. The solid material feedstock is aluminum feedstock, the oxide component is aluminum hydroxide and the liquid melt is an under-saturated molten liquid gallium melt which consists essentially of about 100% (hundred percent) by weight molten gallium.

According to one embodiment of the present invention, the liquid melt used in the hydrogen generation process is enhanced by the addition of a liquid-phase gallium-indium alloy that consist essentially of about 80% (eighty percent)

gallium and 20% (twenty percent) indium (80/20 (Ga/In)). According to another embodiment of the present invention, the liquid melt used is a liquid-phase gallium-indium-tin alloy that consist essentially of 68% (sixty-eight percent)-22% (twenty-two percent)-10% (ten percent).

Figure 2:
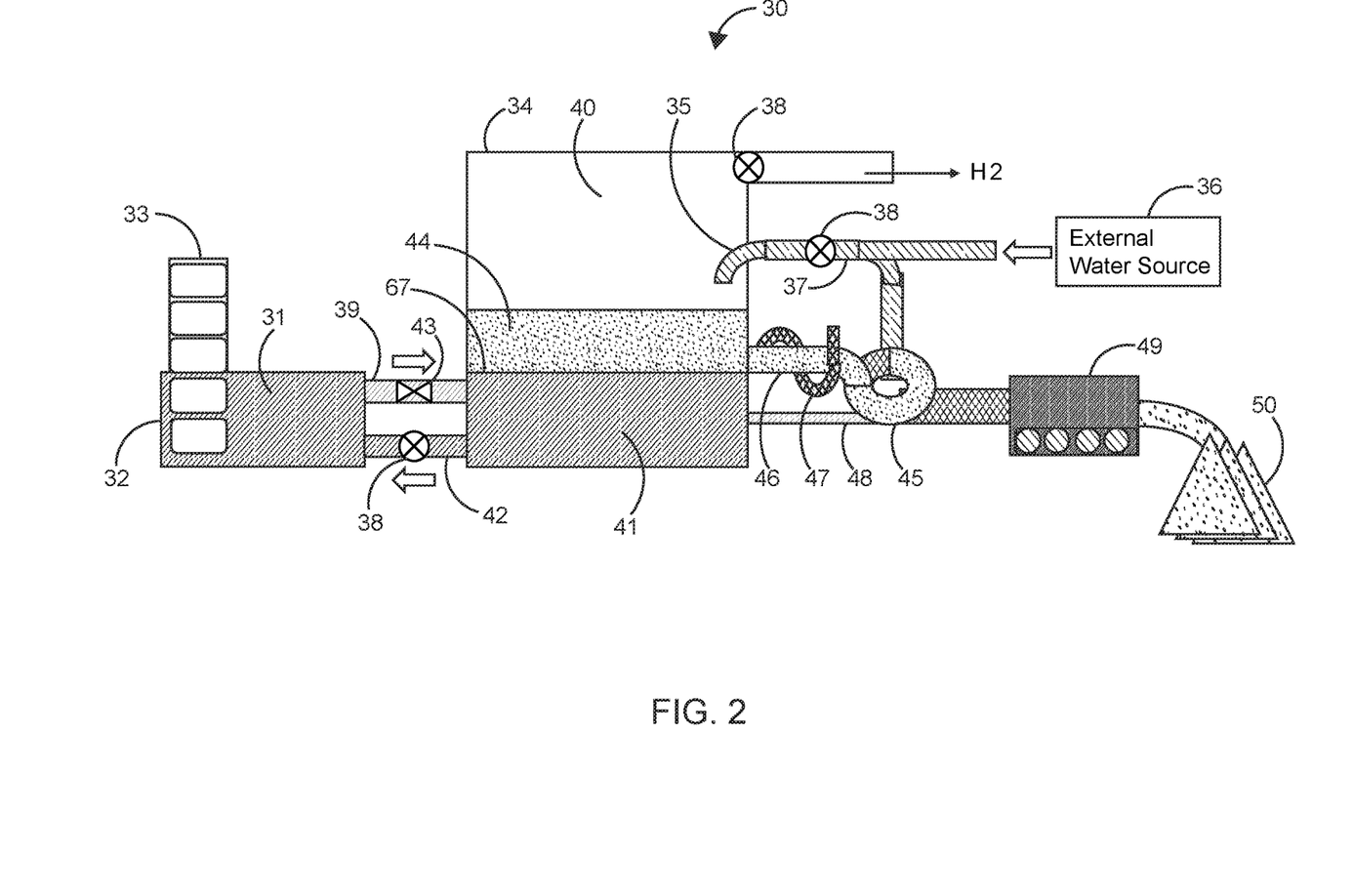
FIG. 2 illustrates an exemplary embodiment of a system for producing the hydrogen gas and an ultra-high purity (UHP) alumina using the water splitting process.

In one specific example illustrated in FIG. 2, a system 30 for producing hydrogen gas, heat and an oxide component using water splitting process is illustrated. The system 30 includes a plurality of chambers which are in fluid communication with a flowline. A liquid melt 31 of under-saturated molten gallium is provided in a first chamber 32 at an ambient temperature. The first chamber 32 is made of a heat-resistant and pressure-resistant material. In the water splitting process, the first chamber 32 is maintained at a temperature between 30° C. and 95° C. and a controlled pressure. The heat-resistant and pressure-resistant material has an iron content of 70% or higher, or stainless steel, carbon steel, or a mixture thereof. Accordingly, when the first chamber 32 is made of a material of iron and stainless steel, it will not influence reactions.

A solid material feedstock 33 is disposed inside the first chamber 32 in such a way that the solid material feedstock 33 is continuously dissolving in the molten gallium 31. Because the solid material feedstock 33 is less dense but heavier than the displaced molten gallium 31 it will sink to a bottom wall of the first chamber 32. Thus, the solid material feedstock 33 is submerged below the surface of the molten gallium 31 without the need of applying an external force. The solid material feedstock 33 dynamically dissolves in the molten gallium to produce a solid material saturated molten gallium. Preferably, the solid material feedstock 33 is aluminum feedstock and the oxide component is aluminum hydroxide or alumina.

The aluminum saturated molten gallium is fed into a second chamber 34, which preferably is a reactor. The second chamber 34 either contains water or water is introduced into the second chamber 34 from an external water source 36 via a water inlet that is positioned at a first inlet of the second chamber 34. The water inlet is in fluid communication with a water pump 37 that is adapted to pump water to the second chamber 34 from the external water source 36. The flow amount of the water pump 37 and pressure released during the flow of water is controlled by adjusting a pressure reduction valve 38. The solid material saturated molten gallium is fed into a second chamber 34 via a first connection tube 39 that is positioned at a second inlet of the second chamber 34. The first connection tube 39 is positioned below the water-liquid melt interface so as to prevent any incursion of water from the second chamber to the first chamber, while maintaining free flow of the molten gallium from the first chamber to the second chamber. When water contacts the aluminum saturated molten gallium, aluminum atoms at a water-liquid melt interface 67 it reacts with the water so as to split the water into the hydrogen gas 40, the oxide component and heat until the aluminum therein is depleted. The pressure reduction valve 38 positioned on the outlet of the second chamber 34 reduces the pressure for the hydrogen gas 40 when released from the second chamber 34. When the gallium-aluminum melt 41 in the second chamber 34 becomes partially or totally depleted of aluminum, then the gallium-aluminum melt 41 is dynamically returned to the first chamber 32 via a second connection tube 42 that is positioned at an outlet of the second chamber 34. Thus, the aluminum from the feedstock 33 in the first chamber 32 is dissolved in the depleted gallium melt 31 and restores it to an aluminum-saturated condition. Preferably, the first connection tube 39 and the second connection tube 42 provides controlled flow of the aluminum-saturated molten gallium from the first chamber 32 to the second chamber 34 and recovered gallium melt from the second chamber 34 to the first chamber 32 respectively utilizing a two-way control valve 43 placed in the first connection tube 39. For instance, when the solid material saturated molten gallium is no longer needed, the first connection tube 39 is closed, causing pressure to increase during the process. The pressure is reduced by the pressure reduction valve 38 placed in the second connection tube 41.

During the continuous water splitting process in the second chamber 34 the concentration of the oxide component dispersed in the water is continuously increased. Water-oxide mixture 44 is moved from the second chamber 34 to at least one centrifuge via an outlet tube 46. The water-oxide mixture 44 is centrifuged to separate the aluminum hydroxide, water and molten gallium. The outlet tube 46 is externally mounted with a heat exchanger pipe 47 which removes the heat generated during the process. During centrifugation, the molten gallium and water is recovered and returned to the second chamber 34 from the at least one centrifuge 45 via a recovery tube 48 that is positioned at a third inlet of the second chamber 34. The recovered molten gallium and water is mixed with the other depleted gallium 41 in the second chamber 34. Then, the depleted molten gallium 41 is transported back to the first chamber 32 containing molten gallium 31 continuously saturated with aluminum.

The wet aluminum hydroxide is passed to at least one furnace 49. The aluminum hydroxide is dehydrated and heated to about 125° C. to convert the aluminum hydroxide to an ultra-high purity (UHP) alumina 50. The water from both the centrifuge and dehydration furnace 49 is captured and returned to the second chamber 34 where it is used in the water splitting process. Thus, the solid material feedstock 33 dissolves continuously into the molten gallium 31 and its alloy in the presence of excess water at ambient temperature to enable the continuous generation of the hydrogen gas 40 and the continuous production of economically important oxides of the solid material feedstock 33. Thus, the system and method provides a continuous and economic conversion of the solid-state Al of any purity to on-demand UHP hydrogen 40 and UHP alumina 50, using any kind of water.

Figure 3:
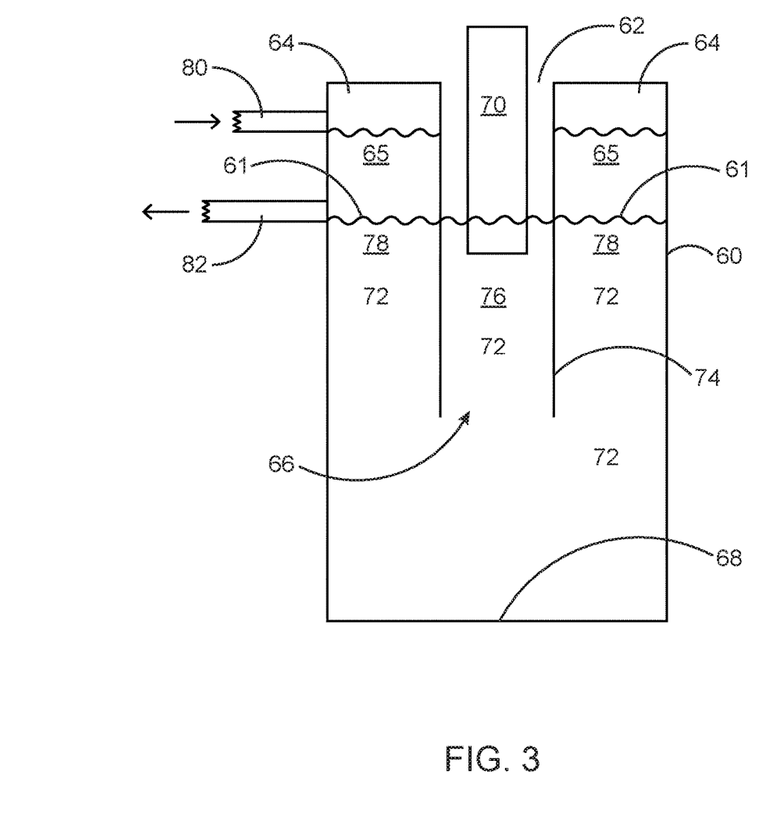
FIG. 3 illustrates a cross-sectional view of a reaction vessel in accordance with an alternative embodiment of the invention.
Figure 4:
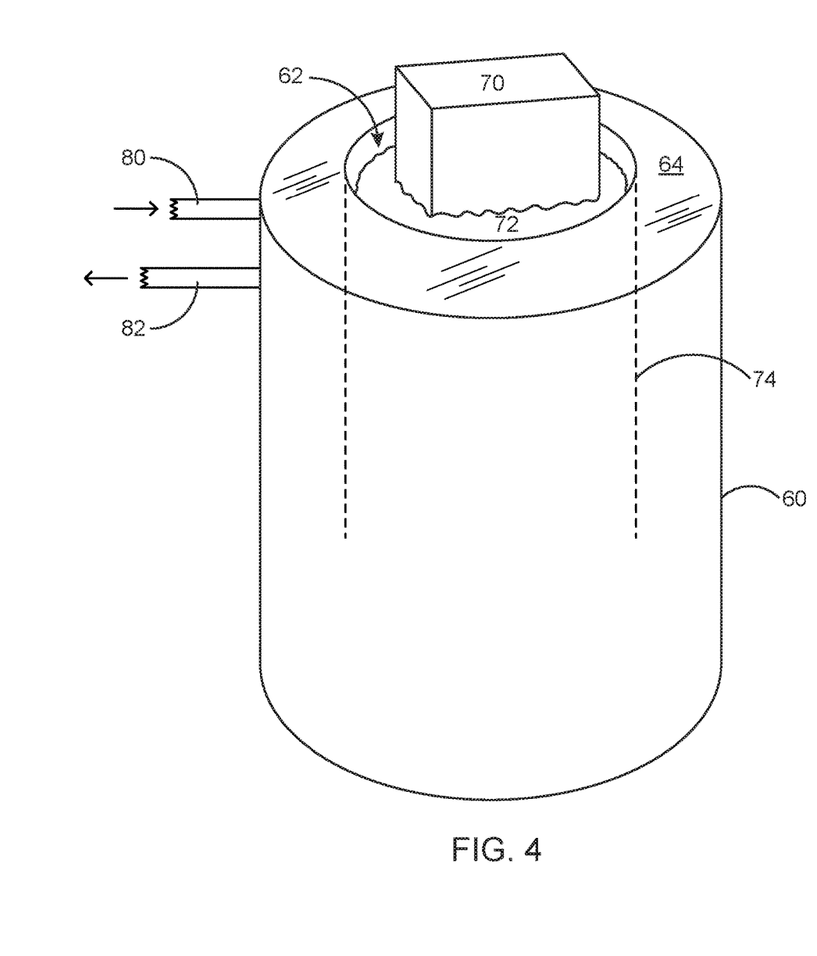
FIG. 4 illustrates an elevated perspective view of the reaction vessel shown in FIG. 3.

Referring to FIG. 3, an alternative embodiment for providing fluid communication of aluminum-saturated molten gallium between a dry side and a wet side of the system is illustrated. A reaction vessel 60 is provided comprised of a first inner chamber 62 and a second outer chamber 64. As further shown in FIG. 4, this reaction vessel 60 is configured as a cylinder where the first inner cylindrical chamber 62 is surrounded by the second outer cylindrical chamber 64. This configuration maintains a fluid communication between the first inner chamber 62 and second outer chamber 64 without necessitating the connection tubes 39 and 42 of the prior embodiment. In this alternate embodiment reaction vessel 60, the first inner chamber 62 is bottomless 66, while the second outer chamber has a bottom 68, thus allowing aluminum-saturated molten gallium or other passivating-oxide preventing agent 72 to fluidly communicate between the inner chamber 62 and outer chamber 64. The bottomless portion 66 of the inner chamber 62 resides well beneath the interface 61 of the molten gallium or other passivating-oxide preventing reagent 72 and water 65 in the outer chamber 64, thus sealing the inner chamber 62 from incursion of water. As the solid aluminum feedstock 70 is dissolved in the molten gallium, it reaches an optimum saturation point that can be continuously maintained through submerging the solid aluminum feedstock at a rate conducive to continuous production. The inner chamber walls 74 create a dry side 76 and a wet side 78 wherein the solid aluminum feedstock 70 can be submerged in the molten gallium or other passivating-oxide preventing agent 72 as herein described. The wet side 78 of the reaction vessel 60 is sealed completely from the dry side 76 and allows for the in-flow of water through a first inlet pipe 80, thus allowing the water splitting process to proceed on the wet side 78 in the manner as described in the prior embodiment. As the concentration of the oxide component dispersed in the water is continuously increased on the wet side 78, it can be removed through an outlet pipe 82 and processed by centrifugation or filtration to separate the water, aluminum hydroxide and molten gallium. The remainder of the system as previously described would be adapted to this reaction vessel 60 with the molten gallium being returned to the dry side 76 in the inner chamber 62, the water being returned to the wet side 68 in the outer chamber 64 and the aluminum hydroxide being exposed to a furnace (not shown) to convert the aluminum hydroxide to an ultra-high purity (UHP) alumina product.

While the invention has been illustrated, and described in detail in the drawings and foregoing description, the same should be considered as illustrative and not restrictive in character. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for producing hydrogen gas, heat and an oxide component using a water splitting process comprising:
    (a) providing a reaction vessel comprising a first chamber providing a dry side containing a passivating-oxide preventing reagent and a second chamber providing a wet side containing a passivating-oxide preventing reagent wherein the passivating-oxide preventing reagent on the wet side is to interface with an oxygen supplying reagent, wherein the wet side is in fluid communication with the dry side;
    (b) submerging a solid material feedstock to be dissolved in the passivating-oxide preventing reagent on the dry side until the passivating-oxide preventing reagent becomes saturated with the solid material feedstock;
    (c) receiving the solid material saturated passivating-oxide preventing reagent from the dry side to the wet side;
    (d) introducing the oxygen supplying reagent to the wet side to create a reaction between the oxygen supplying reagent and the solid material saturated in the passivating-oxide preventing reagent at an interface of the saturated passivating-oxide preventing reagent and the oxygen supplying reagent, the reaction producing the hydrogen gas, heat and oxide component;
    (e) the reaction on the wet side depleting the solid material saturated in the passivating-oxide preventing reagent and creating a gradient of solid material saturated in the passivating-oxide preventing reagent, wherein the passivating-oxide preventing reagent on the dry side is more saturated with solid material than the passivating-oxide preventing reagent on the wet side, this gradient causing the solid material to flow from the dry side to the wet side.

2. The method of claim 1, further comprising the step of maintaining a flow rate of the solid material from the dry side to the wet side sufficient to sustain an appropriate reaction rate at the interface of the saturated passivating-oxide preventing reagent and the oxygen supplying reagent.

3. The method of claim 1, wherein the solid material feedstock is aluminum.

4. The method of claim 3, wherein the passivating-oxide preventing reagent is selected from the group consisting of a molten gallium consisting of essentially of about 100% (hundred percent) by weight, a liquid melt gallium alloy consisting essentially of about 80% (eighty percent) gallium and 20% (twenty percent) indium (80/20 Ga/In) by weight and a liquid melt gallium alloy consisting essentially of about 68% (sixty-eight percent) gallium, 22% (twenty-two percent) indium and 10% (ten percent) tin by weight.

5. The method of claim 4, wherein the oxygen supplying reagent is selected from the group consisting of water and hydrogen peroxide.

6. The method of claim 1, further comprising the step of sealing the dry side from any incursion of oxygen supplying reagent from the wet side.

7. The method of claim 6, wherein the dry side is sealed from any incursion of oxygen supplying reagent from the wet side by maintaining the level of the solid material saturated in the passivating-oxide preventing reagent above the point of flow of the solid material saturated in the passivating-oxide preventing reagent from the dry side to the wet side.

* * * * *